Jan. 16, 1923.
C. J. NUTT.
HEATING DEVICE.
FILED MAY 20, 1920.
1,442,696
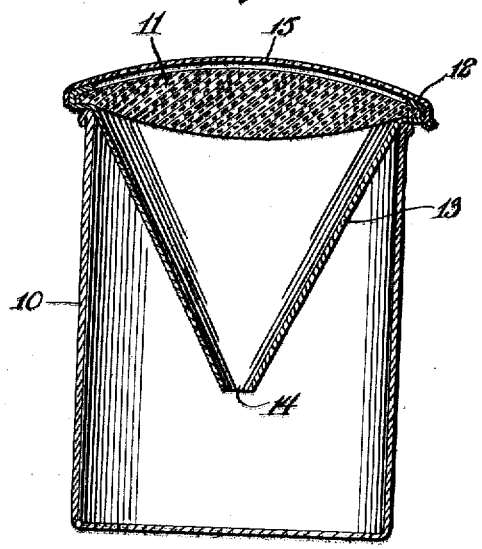
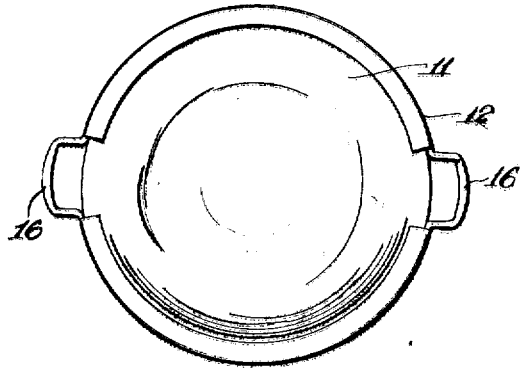
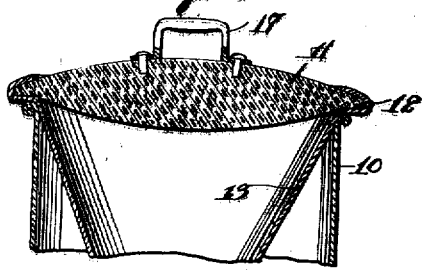
Inventor
Cordie J. Nutt.
By J. Heaney Kelly
Attorney Patented Jan. 16, 1923.

1,442,696

UNITED STATES PATENT OFFICE.

CORDIE J. NUTT, OF SANIBEL, FLORIDA.

HEATING DEVICE.

Application filed May 20, 1920. Serial No. 382,800.

*To all whom it may concern:*

Be it known that I, CORDIE J. NUTT, a citizen of the United States, residing at Sanibel, in the county of Lee and State of Florida, have invented certain new and useful Improvements in Heating Devices, of which the following is a specification.

The present invention provides a novel device for the utilization of the sun's rays including means to augment the force of the rays, (such as glass or other diathermal substances).

The main object of the invention resides in the utilization of the sun's rays for heating purposes and it follows therefore that the structure employed to accomplish this result may be varied and changed without departing from the spirit and scope of the idea.

In the drawings:—

Fig. 1 is a view in vertical cross section showing the mechanical construction of my invention in its preferred embodiment.

Fig. 2 is a top plan view of a modified form of my invention and,

Fig. 3 is a view of another modification of the invention.

In the preferred embodiment of my invention the material to be heated or cooked is placed in a cistern or other container as shown at 10. The cistern or container may be constructed of any suitable or desirable material and may or may not be insulated or provided with a covering of insulating material.

The heating device consists primarily in means to utilize the sun's rays and embodies a top 11 which is preferably made of glass and of double convex construction. The glass may or may not be in the form of a lens.

A metal holder 12 is arranged about the glass 11 to prevent breakage and also to support and carry a depending heating structure 13. The heating structure is preferably made of copper or other substance easily heated and providing a good conductor of heat is open at its lower end as at 14. The heating structure and glass holder are preferably made in a single piece and consists of a funnel-shaped tube, as shown, having its wide end provided with an annular bead forming a supporting shoulder on the outside of the funnel and a groove on the inside into which the glass may be inserted.

From the above construction it will be observed that the glass 11 directs the sun's rays upon the inner surface of the heating structure 13 thus causing the heating thereof and, as a result heating the fluid or liquid in the cistern.

The heating tube 13 is equipped with a hinged cover 15 which may be placed over the glass 11 when the device is not in use.

In some instances the heating structure 13 may be eliminated as in the modified type of invention shown in Fig. 2. In this type the sun's rays are directed directly on to the material or substance within the cistern. The holder 12 may be provided with the handles 16 which may be formed by bending certain parts of the holder as is clearly shown in Fig. 2. The provision of the handle 16 provides for the convenient handling of the heating device.

In the modified form shown in Fig. 3 the heating structure 13 of Fig. 1 has not been eliminated. This form includes a handle portion 17 which is placed approximately in the center of the glass 11 whereby the latter may be conveniently handled.

What is claimed is:—

1. A solar heating device of the character specified comprising a container having an open end, a heating funnel depending from the said open end with its lower terminal penetrating the contents of the container and having its wide end provided with an annular bead forming a supporting shoulder engageable with the edge of the container surrounding the opening, a lens carried by the funnel at its wide end and a lid hinged to the said supporting shoulder and movable to cover the lens when not in use.

2. A solar heating device of the character specified including a vertically disposed container, a funnel-shaped tube suspended within the container penetrating the contents thereof and having means at its upper or flared portion for engaging the top of the container to support the tube therein a lens supported within the flared portion of the tube, and a lens covering at the flared end of the tube and hinged to the support means of the latter, which support means forms a holder for the said lens.

In testimony whereof I affix my signature.

CORDIE J. NUTT.